(12) United States Patent
Asmussen et al.

(10) Patent No.: US 8,997,991 B2
(45) Date of Patent: Apr. 7, 2015

(54) WAFER VIAL WITH INERT INTERMEDIATE LAYERS

(75) Inventors: Bodo Asmussen, Bendorf (DE); Markus Krumme, Denville, NJ (US)

(73) Assignee: LTS Lohmann Therapie Systeme AG, Andernach (DE)

(*) Notice: Subject to any disclaimer, the term of this patent is extended or adjusted under 35 U.S.C. 154(b) by 1179 days.

(21) Appl. No.: 12/065,649

(22) PCT Filed: Aug. 25, 2006

(86) PCT No.: PCT/EP2006/008335
§ 371 (c)(1),
(2), (4) Date: Mar. 4, 2008

(87) PCT Pub. No.: WO2007/028507
PCT Pub. Date: Mar. 15, 2007

(65) Prior Publication Data
US 2008/0230426 A1    Sep. 25, 2008

(30) Foreign Application Priority Data
Sep. 7, 2005   (DE) .......................... 10 2005 042 374

(51) Int. Cl.
*B65D 75/00*   (2006.01)
*B65D 57/00*   (2006.01)

(52) U.S. Cl.
CPC ..................... *B65D 57/00* (2013.01)

(58) Field of Classification Search
USPC ........... 206/499, 535, 38, 449, 454, 493, 526, 206/524.4; 426/119, 120, 124, 125, 76; 221/26
See application file for complete search history.

(56) References Cited

U.S. PATENT DOCUMENTS

| | | | | |
|---|---|---|---|---|
| 3,051,584 A | * | 8/1962 | Tindall | 426/115 |
| 3,519,124 A | | 7/1970 | Barker et al. | |
| 3,674,176 A | * | 7/1972 | Sagi | 221/135 |
| 3,730,739 A | * | 5/1973 | Seiferth et al. | 26/119 |
| 4,069,348 A | * | 1/1978 | Bush | 426/119 |
| 4,453,320 A | | 6/1984 | Zimmermann et al. | |
| 5,016,373 A | * | 5/1991 | Theno | 40/594 |
| 5,499,740 A | * | 3/1996 | Huck et al. | 221/70 |
| 5,698,217 A | * | 12/1997 | Wilking | 424/448 |
| 6,655,112 B1 | | 12/2003 | Cremer et al. | |
| 6,708,826 B1 | | 3/2004 | Ginsberg et al. | |

(Continued)

FOREIGN PATENT DOCUMENTS

| | | |
|---|---|---|
| DE | 6600828 U | 1/1969 |
| DE | 3039386 A1 | 5/1982 |

(Continued)

*Primary Examiner* — Steven A. Reynolds
(74) *Attorney, Agent, or Firm* — Frommer Lawrence & Haug LLP

(57) ABSTRACT

The invention relates to a packaging unit comprising a container and hygroscopic or humidity softenable film-like materials. For this purpose, said film-like materials are stacked in the container and a separating material which is chemically inert and physically stable with respect thereto is arranged at time between said film-like materials. Each time, said separating material is brought into contact with two film-like materials and does not adheres or adheres less strongly to at least one film-like material that to the other film-like material. Said invention makes it possible to develop a packaging unit provided with a container which guarantees a reliable individual withdrawal of the hygroscopic film-like materials.

6 Claims, 2 Drawing Sheets

(56) References Cited

U.S. PATENT DOCUMENTS

Figure 1:
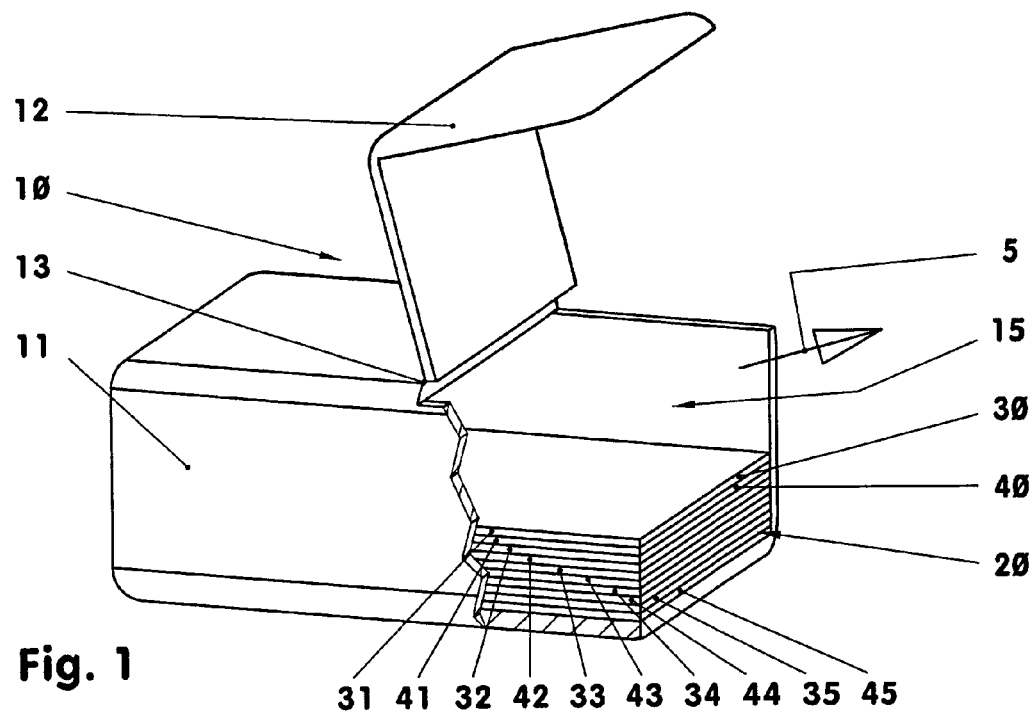

| | | | |
|---|---|---|---|
| 6,878,390 B2 * | 4/2005 | Murray et al. | 426/76 |
| 6,986,923 B1 | 1/2006 | Junghans et al. | |
| 7,188,729 B2 * | 3/2007 | DeJonge | 206/535 |
| 7,287,666 B2 * | 10/2007 | De Laforcade | 221/65 |
| 2004/0043134 A1 * | 3/2004 | Corriveau et al. | 426/658 |

FOREIGN PATENT DOCUMENTS

| | | |
|---|---|---|
| DE | 19800682 A1 | 7/1999 |
| EP | 1103489 B1 | 5/2001 |

* cited by examiner

WAFER VIAL WITH INERT INTERMEDIATE LAYERS

The present invention relates to a packaging unit comprising a container and film-like materials that are either hygroscopic or soften under the influence of moisture.

Hygroscopic film-like materials are exemplified by edible films, strips or wafers, used e.g. as medicinal preparations, confectionery products, cosmetics and preparations for oral hygiene. They rapidly dissolve in water and saliva, for example. They are generally made of hydrophilic and hygroscopic matrix polymers, such as for example polysaccharides belonging to the starch or cellulose family, polyvinylpyrrolidone, polyvinyl alcohol and pullulan. They have a high affinity for water and readily absorb it. This ensures a rapid dissolution when the product is taken in the mouth, but it also results in the absorption of a large amount of moisture from atmospheric humidity. Film-like materials contain at least 5 wt-% of moisture. If they contain less moisture, they may become brittle. With a moisture content of more than 10 wt-%, film-like materials that are hygroscopic or soften under the influence of moisture become soft and tend to undergo plastic deformation. Furthermore, the tendency of film-like materials to adhere increases with their moisture content, which makes it difficult to handle them and especially to remove them singly.

German Patent No. 198 00 682 A1 discloses a packaging unit made of hygroscopic film-like materials. The latter are first packed individually in primary packaging units. A number of primary packaging units are then combined in a secondary packaging unit. This is troublesome and expensive.

The aim of the present invention is therefore to provide a packaging unit with a container from which the user can reliably remove individual items of film-like materials that are hygroscopic or soften under the influence of moisture.

This aim is achieved with the aid of the characteristics set out in the main claim. For this purpose, the film-like materials are arranged in the container in a stacked form. A separating material that is physically stable and chemically inert to these film-like materials is placed between any two film-like materials. The separating material is in contact with both these film-like materials in every case. In addition, the separating material either does not adhere to at least one of these two film-like materials at all or it adheres to it less than it does to the other film-like material.

Other details of the invention are given in the subclaims and in the embodiments presented schematically in the following description.

Figure 2:
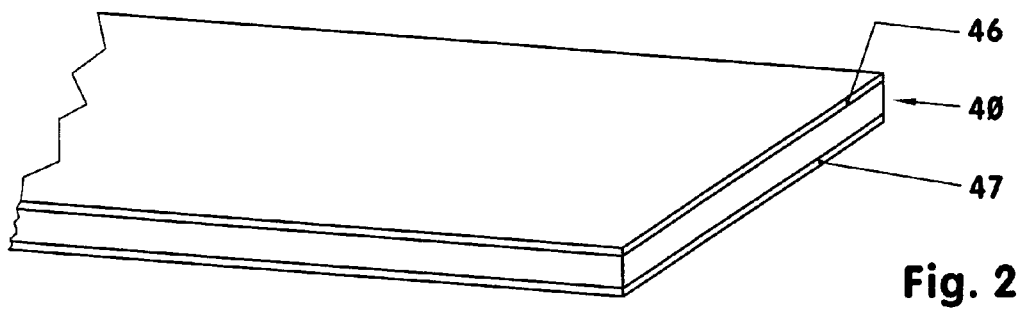
Figure 3:
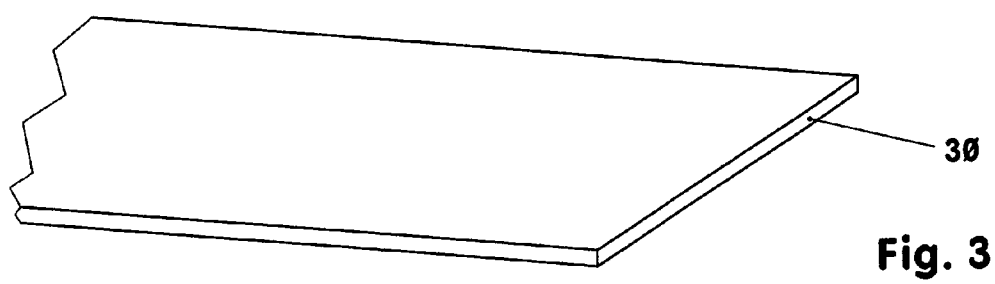
Figure 4:
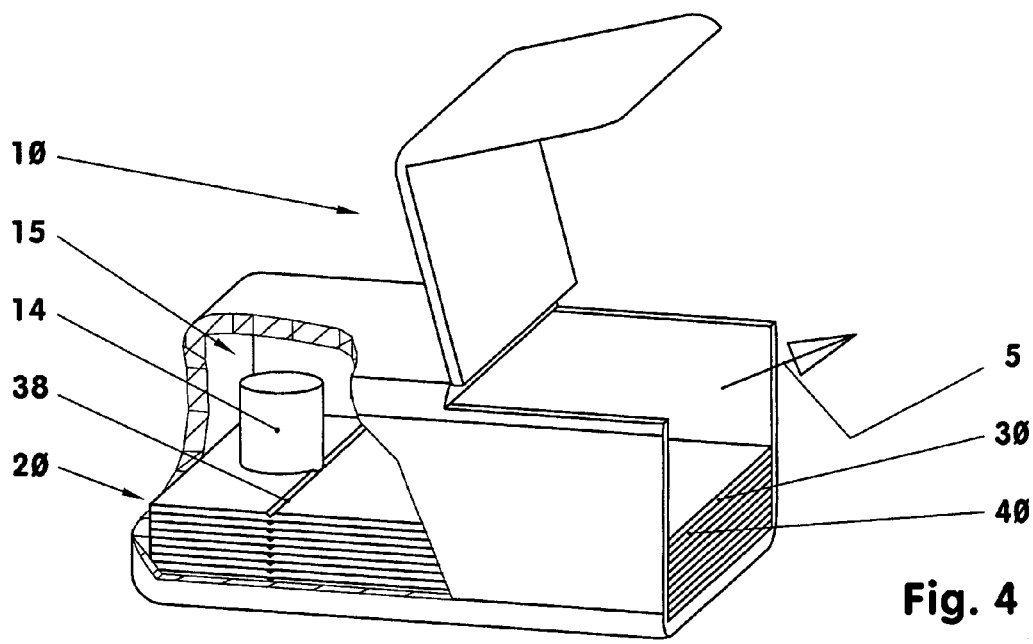
Figure 5:
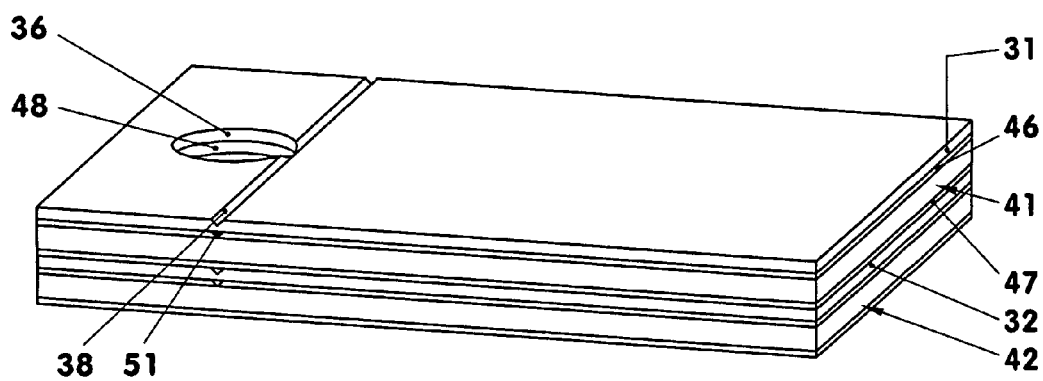
Figure 6:
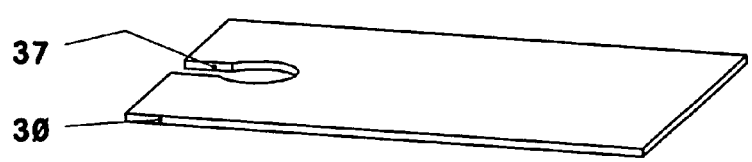
Figure 7:

FIG. 1—Box with wafers and separating materials
FIG. 2—Separating material
FIG. 3—Wafer
FIG. 4—Box with mechanically restrained wafers and separating materials
FIG. 5—Detail of the stack shown in FIG. 4
FIG. 6—Wafer with a restraint
FIG. 7—Separating material with a wafer.

FIG. 1 shows a container (10) accommodating a stack of film-like materials (30), with separating materials (40) lying between them.

The container (10) is for example a box, a wafer vial, etc., made of plastic, glass or another material that does not absorb flavoring substances or active substances from film-like materials (30). The box (10) shown in FIG. 1 is for example rectangular. It consists e.g. of a casing (11) and a hinged lid (12). In this embodiment, the lid (12) is connected to the casing (11) with the aid of a film coupling (13). The lid (12) can be a sliding lid, a removable lid, etc. The corners and edges of the box (10) are for example rounded off. When the lid (12) is closed, the box (10) e.g. mostly resists the penetration of extraneous substances from the outside. If necessary, additional insulating means can be arranged on the lid (12) and/or the casing (11) so as to close the box (10) hermetically at least during storage.

The inside space (15) formed in the box (10) accommodates a stack (20) of film-like materials (30) and separating materials (40) arranged in the form of layers. The film-like materials (30) are for example individual wafers (31-35) that contain flavoring substances and active substances. Each of these wafers (31-35) contains e.g. a dose of a medicinal product. The multidose pack illustrated in FIG. 1 contains e.g. five wafers (31-35), i.e. five doses of a medicinal product. In this case, (31) is the top wafer in the stack (20), while (35) is the bottom wafer in the stack of wafers (31-35).

The wafers (31-35) have for example a rectangular shape with a base area measuring e.g. 1 inch by 1⅓ inches (see FIG. 3). It can also be square, round, triangular, hexagonal, etc. The thickness of the wafers (31-35), which is exaggerated here, can be e.g. between 10 and 100 micrometers. In most applications, the wafers (31-35) have a thickness of between 20 and 60 micrometers, but they can also be up to 250 micrometers thick. The wafers (31-35) weigh 40-100 milligrams. The wafers (31-35) are hygroscopic or they soften under the influence of an elevated moisture content. Their predetermined moisture content in the present case is e.g. 5 wt-%. The predetermined moisture content can be less than this value, for example 3 wt-%, provided that the wafers (31-35) do not become brittle. A higher moisture content is also feasible.

The separating materials (40) shown in FIG. 2 are for example plastic film pieces (41-45) coated on both sides. Separating material (41) for example lies here between wafer (31) and wafer (32) in the stack (20). The separating film (45) lies below wafer (35) here. The separating films (41-45) have e.g. a rectangular base area, which has the same size as the base areas of the wafers (31-35) in the present case. The base areas of the separating films (41-45) can also be larger than the base areas of the wafers (31-35). Their thickness is for example between 10 and 100 micrometers.

The main material in the separating films (41-45) is e.g. polyethylene terephthalate (PET). When the separating films (41-45) are in contact with the wafers (31-35), this material is physically stable and chemically inert, irrespective of the moisture content of the wafers (31-35).

The coating layers (46,47) on the two sides of the separating films (41-45) are for example silicone layers. For example, coating (46) is applied here to the upper or top surface of the separating films (41-45), while coating (47) is applied to the lower or bottom surface of the separating films (41-45). The two coating layers (46,47) have the same thickness in this embodiment, but they have different properties. The top coating (46) is in each case such that the wafers (31-35) that lie above the separating films (41-45) in the stack (20) adhere to it. The binding force between the wafers (31-35) and the coating layers (46) is e.g. such that—when e.g. the top wafer (31) is being removed from the box (10)—the top separating film (41) comes with it. This binding force is for example due to an adhesive bond. An adhesive bond is a bond between a solid boundary surface and a second phase that is formed either of individual particles, molecules, droplets or powders, or else of a continuous liquid or solid film. The adhesion can be due to electrostatic forces, van der Waals forces or chemical bonds.

By contrast, each lower coating layer (47) on the separating films (41-45) in this embodiment is anti-adhesive. Therefore, e.g. wafer (32), which lies below the separating film (41) in the stack (20), does not adhere to the lower coating layer (47) on this separating film (41). This ensures that—when wafer (31) is being removed—only it, i.e. wafer (31), comes out of the box (10).

The coating layer (47), which is described here as an anti-adhesive coating layer (47), can also adhere to the wafers (32-35). However, this binding force is less strong than those prevailing between the upper adhesive coating (46) and the wafers (31-35).

The coating layers (46,47) cannot absorb the active substance present in the wafers (31-35), so they form a diffusion barrier to prevent the migration of the active substance from the wafers (31-35) into the separating films (41-45). The separating material (40) therefore does not change even if the container (10) is stored for a long time in a humid environment.

The silicone coating layers (46,47) described above can be replaced by coating layers consisting of fluoropolymers or polyolefins (PE, PP). In the case of these coating layers, too, the forces of contact and separation can be chosen in such a way that one of the two film-like materials (30) lying next to the separating material (40) adheres to this material, but the other film-like material (30) does not.

The separating material (40), which is e.g. a PET film, can be such that e.g. it only has a bottom silicone coating layer (47). This is for example anti-adhesive, so that e.g. the wafer (32) lying below the separating film (41) in the stack (20) does not adhere to this separating film (41).

The separating material (40) can also be made of paper, and have a polyethylene coating on both sides. At least one side of the paper is then coated additionally e.g. with a silicone layer (47). This gives for example an adhesive polyethylene layer (46) that binds to the upper wafer (31). The silicone layer (47) which then lies below it does not adhere to the wafer (32) that lies below the separating paper (41).

It is also possible to use other separating materials (40), such as plastic films, composite materials, etc. that are chemically inert and physically stable to the active substances and flavoring substances in the film-like materials (30).

It is also possible to make both surfaces of the separating material (40) anti-adhesive or to give them an anti-adhesive coating. For example, a thin film made of polyethylene terephthalate can be used in such a way that the film-like materials (30) do not adhere to it.

The different adhesive properties of the surfaces of the separating material (40) can therefore be ensured in the case of an uncoated separating material (40) either when making the basic material or by giving it a secondary coating (46,47).

The film-like material (30) can also be produced on the separating material (40) itself. In this case, e.g. the later separating layer (40) is coated with a film (30) containing an active substance. The film (30) becomes e.g. adhesively attached to the separating layer (40) when it is dried after the coating stage. After the drying operation (the film-like material (30) has a residual moisture content here), the film-like materials (30) and the separating layers (40) are e.g. stacked and placed in the box (10). Since the film-like material (30), e.g. the wafer (32), which lies below the separating layer (40) in the stack (20), e.g. below the separating film (41), only now comes into contact with this separating film (41), these two parts (32 and 41) do not adhere to each other.

The film-like materials (30) prepared and dried on the separating materials (40) can also be wound up on a roll. In this case, too, the film-like material (30), which lies on the outside of the separating material (40) in the radial direction of the roll, does not adhere to this separating material (40). This prevents the tearing of the film-like material (30) during the winding-up or unwinding operation. As a result, the separating material (40) wound up on the roll can be used again later in the box (10), e.g. in the form of separating films (41-45).

The atmospheric humidity in the storage space changes during the storage of the packaging unit. If the box (10) is not closed hermetically, moisture will penetrate into the film-like materials (30) as the humidity of the surrounding air rises, and the film-like materials (30) will absorb this moisture. If the humidity of the surrounding air decreases, the moisture content of the film-like materials (30) will also drop. Under the climatic conditions customary in Central Europe, the moisture content of the various film-like materials (30) is for example 5-10 wt-%. If however the box (10) is stored in a tropical country, for example, the moisture uptake can be so high that the film-like material (30) turns soft and tends to stick. This can also happen e.g. when the box (10) is carried in the breast pocket of a shirt on warm days. The various film-like materials (30) then adhere more to e.g. the upper coating layer (46) on the separating material (40). In the case of the box (10) shown in FIG. 1, for example the wafer (31) adheres to the upper coating layer (46) on the separating film (41). The anti-adhesive lower coating layer (47) on this separating film (41) prevents the attachment of the wafer (32) below the separating film (41) to this separating film (41).

To remove the wafers (31-35) from the box (10) shown in FIG. 1, the lid (12) is opened and the top wafer (31) is held between the fingers and taken out of the box (10) in the removal direction (5). The separating film (41) adhering to the wafer (31) is also removed when the latter is being withdrawn from the box. However, the next wafer (32) remains in the stack (20). The contents of the stack (20) can therefore be dispensed safely and reliably by the removal of just one wafer at a time. As a result, there is no risk that two or more doses of the medicinal product are inadvertently taken out of the box (10) when the wafers (31-35) contain an active substance of a pharmaceutical product.

Once removed, the wafer (31) can be freed from the separating film (41), e.g. by pulling it off. The wafer (31) can now be placed e.g. on the tongue for oral administration.

To facilitate the separation of the film (30) with the active substance from the separating material (40), the separating material (40) can be made stiffer than the film (30). For example, if the separating material (40) is a biaxially stretched PET film, both the film (30) and the separating material (40) can be 35 micrometers thick. If the separating material (40) is paper, however, it will have a thickness of e.g. 100 micrometers.

The packing unit can therefore be made economically, and it ensures a safe and reliable dispensing operation even when the film-like materials (30) used have absorbed some moisture during storage.

FIG. 4 shows a box (10) with mechanically restrained wafers (31-35) and separating films (41-45). The box (10), the wafers (31-35) and the separating materials (41-45) have at least approximately the same shape and the same physical and chemical properties as the parts (10, 30 and 40) described in connection with FIGS. 1-3.

The inside space (15) formed in the box (10) shown in FIG. 4 accommodates a stack (20) of wafers (31-35) and separating films (41-45). A vertical bolt (14), similarly placed in the inside space (15), projects through this stack (20). The wafers (31-35) and the separating films (41-45) are provided with holes (36, 48) to make this possible. FIG. 5 shows a detail of the stack (20) with two wafers (31,32) and two separating films (41,42). The wafers (31,32) and the separating films (41,42) have the same base area in this case. A separating film

(41) coated on both sides is interposed between the two wafers (31,32). The upper coating layer (46) is such here that the top wafer (31), which is the first to be removed, adheres to it. The lower coating layer (47) on the separating film (41) is for example a silicone layer, to which the wafer (32) that lies below it in the stack (20) does not adhere. The separating material (42) lying below this in the stack (20) shown in FIG. 5 is constructed in the same way as the first separating material (41) mentioned above.

Each of the wafers (31-35) and separating materials (41-45) has a perforation (38,51), which is only indicated here and which lies normal to the removal direction (5) of the wafers (31-35).

When e.g. the first wafer (31) is to be taken out, the user will grip the wafer (31) with the separating film (41) and remove them from the box (10) with a slight tug. As a result, the wafer (31) and possibly also the separating film (41) adhering to it are torn off along the perforations (38,51). The wafer (31) can be used as soon as it is freed from the separating film (41).

FIG. 6 shows by way of example a film-like material (30) that can be restrained with the aid of a loop (37) on the bolt (14). This film-like material (30) for example has no perforation (38). The corresponding separating material (not shown here) can have the same shape. The film-like material (30) can be for example such that it does not adhere either to the separating material (40) that lies over it in the stack (20) or to the separating material (40) that lies under it in the stack (20). When the film-like material (30) is being removed from the box (10), the loop (37) expands and only the film-like material (30) comes out. The separating material (40) stays e.g. in the stack (20) as a protective cover. It is then removed before the next film-like material (30) is extracted.

FIG. 7 shows a rectangular wafer (31) as an example, which is applied to a larger separating film (41). The separating film (41) is for example made of PET and only carries a lower coating (47). The separating film (41) has lateral cut-outs (49), with which it can hold the two lateral restraining bolts in the inside space (15) of a box (10) (see FIG. 1 or FIG. 4). For removal, for example the separating film (41) is seized by the hand and extracted from the box (10) together with the wafer (31) applied to it. The two parts (31,41) are then separated from each other.

The film-like materials (30) and/or the separating materials (40) can also have different geometrical shapes. The stack (20) can also be arranged the other way around, so that e.g. the film-like materials (30) are attached to the lower side of the separating materials (40).

Combinations of the various embodiments are also possible.

LIST OF DESIGNATIONS

5 Removal direction
10 Container, box
11 Casing
12 Lid
13 Film coupling
14 Bolt
15 Inside space
20 Stack
30 Film-like materials, films
31-35 Wafers
36 Hole
37 Loop with rear grip
38 Perforation
40 Separating materials, separating layers
41-45 Pieces of film, separating films, separating papers
46 Upper coating, adhesive coating
47 Lower coating, anti-adhesive coating
48 Hole
49 Cut-out
51 Perforation

The invention claimed is:

1. A packaging unit comprising a container and film-like materials that are hygroscopic or soften under the influence of moisture, characterized in that:
   the film-like materials (30) are arranged in the container (10) in the form of a stack,
   interposed between any two film-like materials (30), there is a separating material (40) that is physically stable and chemically inert to these film-like materials (30),
   each separating material (40) is in contact with the two film-like materials (30) and
   the separating material (40) does not adhere to at least one of these two film-like materials (30) or it adheres to it less strongly than it does to the other film-like material (30);
characterized in that the individual separating material (40) is a PET film with an anti-adhesive coating (47) at least on one side; and
the separating material (40) carries—on the side opposite to that with the anti-adhesive coating (47)—a coating (46) that is in adhesive contact with the film-like material (30).

2. A packaging unit as claimed in claim 1, characterized in that the film-like materials (30) have a minimum moisture content 3 wt-%, based on the total weight of the film-like materials.

3. A packaging unit as claimed in claim 1, characterized in that separating materials (40) have the same size as or are larger than the film-like materials (30).

4. A packaging unit as claimed in claim 1, characterized in that the container (10) is tightly closed.

5. A packaging unit as claimed in claim 1, characterized in that at least the separating materials (40) are mechanically restrained in the container (10).

6. A packaging unit as claimed in claim 5, characterized in that at least the film-like materials (30) have a perforation (38).

* * * * *